June 22, 1954    P. M. CHRISTENSEN    2,681,966
CIRCUIT BREAKER ENCLOSURE AND MOUNTING
Filed July 12, 1951    2 Sheets-Sheet 1
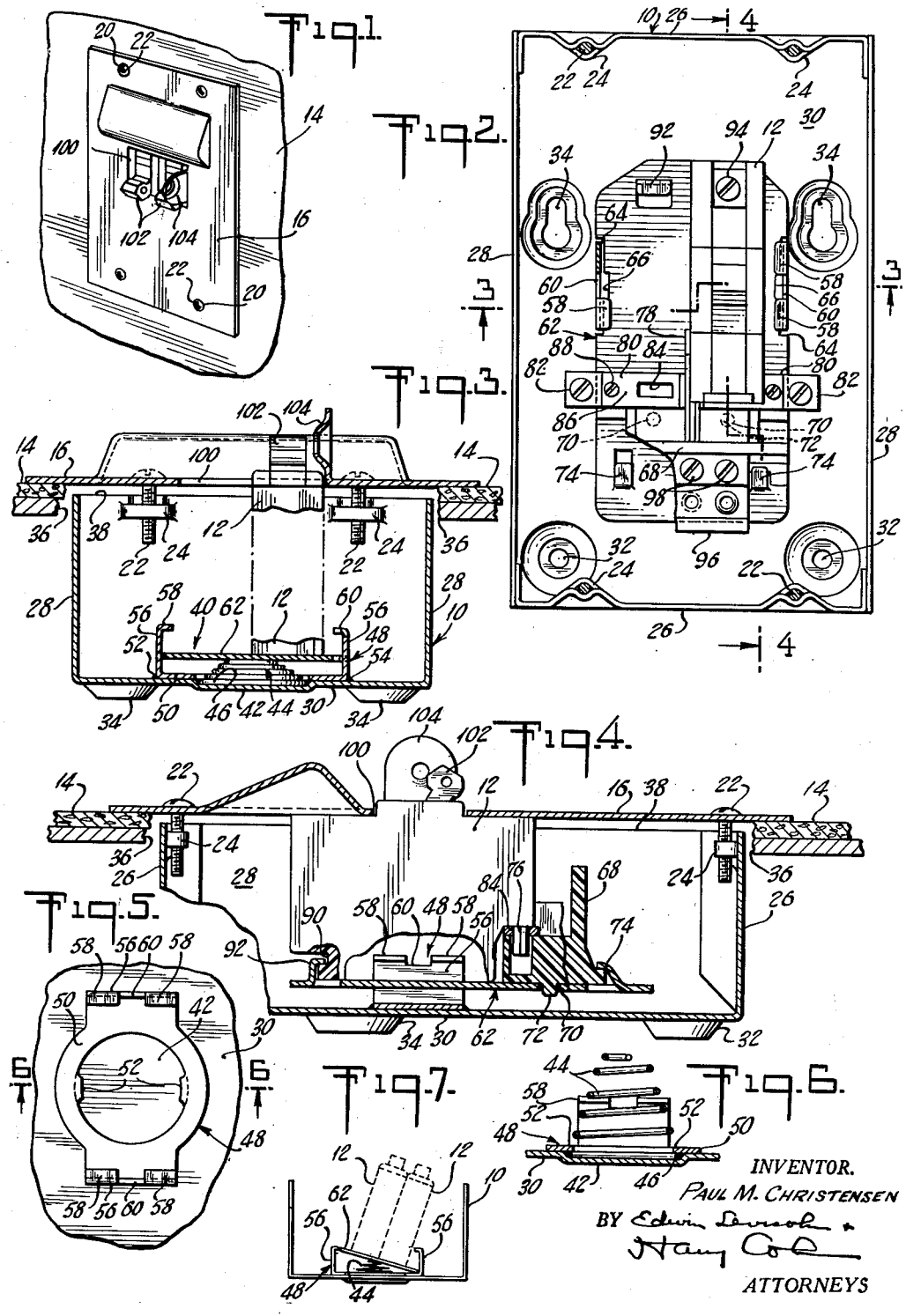
INVENTOR.
PAUL M. CHRISTENSEN
BY
ATTORNEYS

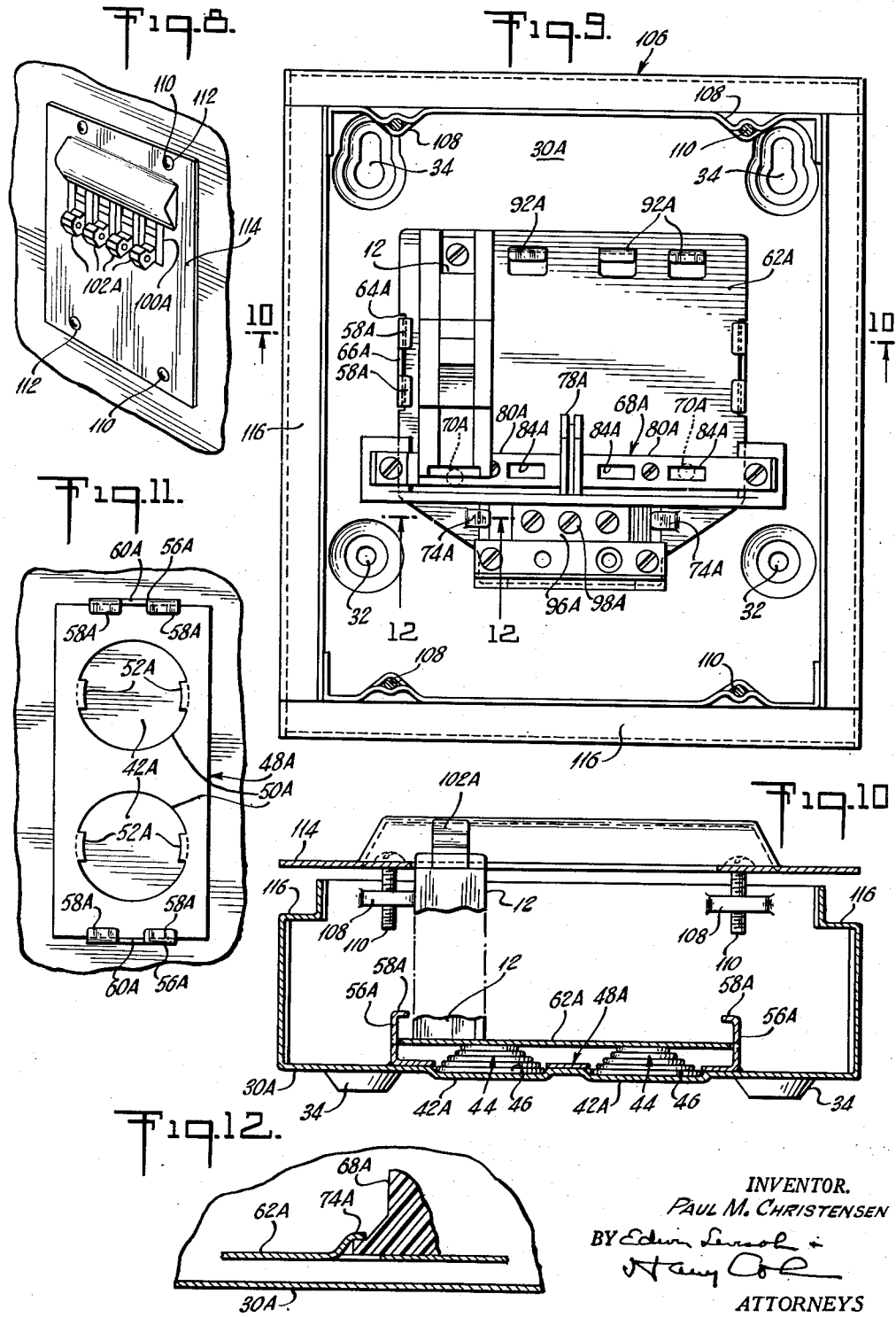

Patented June 22, 1954

2,681,966

UNITED STATES PATENT OFFICE 2,681,966

CIRCUIT BREAKER ENCLOSURE AND MOUNTING

Paul M. Christensen, West Orange, N. J., assignor to Federal Electric Products Company, Newark, N. J., a corporation of Delaware Application July 12, 1951, Serial No. 236,441

21 Claims. (Cl. 200—168)

This invention relates to means for mounting an electric circuit device, such as a circuit breaker, within an enclosure.

The primary object of the invention is to provide an improved adjustable mounting for an electric circuit device within an enclosure which is adapted for flush-mounting, for example in a wall.

Another object is to provide an enclosure having a mounting pan therein which is mounted for substantial universal movement relative to the front plate or cover of the enclosure in response to the adjustment of the cover on the enclosure in order to compensate for variations in the planar positions of the cover, especially when the enclosure is disposed for flush-mounting in a wall, for example when the outer surface of the wall is not precisely parallel to the plane of the front of the enclosure, which in the flush-mounting is disposed rearwardly of said wall surface.

A further object is the provision of a mounting pan universally adjustable relative to the back of the enclosure or which is readily removable therefrom to facilitate the wiring of the electric device to be carried thereby.

A further object is the provision of improved means for securing an insulated contact block member in position on a mounting pan.

The above and other objects, features and advantages of the present invention will be more fully understood from the following description considered in connection with the accompanying illustrative drawings.

In the drawings:

Fig. 1 is a perspective view of an enclosure, pursuant to the present invention, said enclosure being illustrated installed for flush-mounting in a wall, and being adapted to contain two circuit breakers;

Fig. 2 is a top plan view, on a larger scale, of the enclosure with the cover or front plate removed, portions being broken away for purposes of illustration;

Fig. 3 is a sectional view taken on the line 3—3 of Fig. 2 and including the enclosure cover;

Fig. 4 is a sectional view taken on the line 4—4 of Fig. 2, including the enclosure cover, portions being broken away for purposes of illustration;

Fig. 5 is a detail view on an enlarged scale, illustrating a pan mounting member;

Fig. 6 is a sectional view taken on the line 6—6 of Fig. 5 and including the spring associated with the mounting member;

Fig. 7 is a diagrammatic view illustrating an operative position of the mounting pan;

Fig. 8 is a view similar to Fig. 1 of an enclosure pursuant to the present invention, which is adapted to contain four circuit breakers;

Fig. 9 is a top plan view, on an enlarged scale, of the enclosure illustrated in Fig. 8, the front plate or cover thereof being removed;

Fig. 10 is a sectional view taken on the line 10—10 of Fig. 9;

Fig. 11 is a detail view, on an enlarged scale, illustrating the pan mounting member of the enclosure lilustrated in Figs. 8 and 9; and Fig. 12 is a sectional view taken on the line 12—12 of Fig. 9.

Referring now to Figs. 1 through 7 of the drawings in detail, there is illustrated an enclosure 10 for electrical circuit devices such as, for example but without limitation, the circuit breaker 12. Said enclosure is preferably formed of metal and is of the type which is adapted either for surface mounting on a wall 14, or other supporting surface, or for flush-mounting in the wall or supporting surface, as illustrated in Figs. 1, 3 and 4. As here shown, the enclosure 10 is provided with a cover or front closure plate 16 which is adapted for removable mounting thereon. More specifically, the cover 16 is apertured as at 20 for receiving the fastening members or screws 22 for threaded engagement in the tapped members 24 provided on the opposing end walls 26—26 of the enclosure. The enclosure is also provided with the side walls 28—28 and with the rear or back wall 30 which, as here shown, is provided with apertures 32—32 and slots 34—34 for receiving suitable fastening elements, as is well known to those skilled in the art, when it is desired to surface mount the enclosure. It will also be understood that the enclosure is provided with the customary knockouts (not illustrated) to accommodate electric wires or cables. It will also be noted that the enclosure 10 is adapted for flush-mounting in a wall or other suitable surface. In this connection, as illustrated in Figs. 3 and 4, it will be noted that the enclosure is disposed within an opening 36 provided in the wall 14 so that the open front of the enclosure indicated by the reference numeral 38, is disposed rearwardly of the outer surface of the wall 14. However, it will be noted that the closure 16 extends laterally of the side walls and end walls of the enclosure 10 and is in abutment with the wall surface 14.

Pursuant to the present invention, and in order to compensate for variations in the planar positions of the cover 16, when the enclosure 10 is disposed for flush-mounting, as in Figs. 3 and 4, for example when the outer surface of the wall 14 is not precisely parallel to the plane of the open front 38 of the enclosure, provision is made for a substantially universal mounting means 40 within the enclosure. More specifically, the rear wall 30 is pressed outwardly, as at 42, to define a generally circular recess therein for seating an end of a conical helical resilient member or spring 44. More specifically, it will be noted that the spring convolution 46 of maximum diameter is seated within the recess 42. In order to retain the spring in position in said recess, there is provided a combined retainer and guide member 48. Referring specifically to Figs. 3 and 5, it will be noted that the member 48 is provided with a circular portion 50 which is mounted concentrically with the circular recess 42 and is provided also with the confronting lugs 52—52 which overlie said recess, as best illustrated in Fig. 6. Due to said arrangement of the circular portion 50 and the recess 42, it will be understood that the largest convolution 46 of the spring 44 may be threaded into position in the recess and retained therein against displacement outwardly therefrom by the overlying lugs 52—52, as best illustrated in Fig. 6. It will be understood that the member 48 is retained in position on the back wall 30 in any suitable manner, for example, by being brazed or welded thereto, as indicated at 54 in Fig. 3.

In addition to the circular portion 50, the member 48 is also provided with the opposed upstanding guide parts 56—56, having the inwardly turned ears 58 at the free ends thereof, respectively. More specifically, it will be noted that each guide part 56 is provided with a pair of spaced ears 58 which are separated by the open slot 60 defined therebetween, the purpose of which is hereinafter described in detail.

In addition to its function as constituting a retaining means for the conical helical spring 44, the member 48 also serves as a guide and retainer for the movable mounting pan, support or back plate 62 which is preferably formed of metal or other suitable material. More specifically, said pan is provided at the opposing side edges thereof with the cut-out portions 64 which adapt the pan for slidable engagement with the guide parts of the member 48, as illustrated in Fig. 2. It will be noted that the previously described ears 58 overlie the pan 62 at the cut-out portion thereof to limit the outward movement of the pan relative to the back wall 30 of the enclosure 10. In this connection, it will be noted, as illustrated in Fig. 3, that the pan is disposed on the upper small end of the spring and it will be understood that the spring serves to bias the pan in a direction toward engagement with the ears 58. Due to said mounting of the pan on the narrow or small end of the conical helical spring 44, it will be apparent that the pan is capable of being moved angularly to pivot in all directions from the position thereof illustrated in Fig. 3, being retained against rotation in its own plane by its engagement with the guide parts 56 and being limited against outward displacement by the ears 58, said small end serving as a fulcrum for the pan. For example, as illustrated in Fig. 7, it will be apparent that the pan may be tilted or pivoted in all directions to provide a universal mounting thereof relative to the back plate and front opening of the enclosure 10. In this connection, it will be noted from Fig. 7, that during said tilting movement, the unsecured end of the spring 44 can move laterally relative to the secured end thereof to facilitate said movement of the pan. In order to facilitate the mounting of the pan in the member 48 and also its removal therefrom, the pan is provided with an additional cut-out 66 at each of the cut-out portions 64 thereof. It will be noted, as illustrated in Fig. 2, that the cut-out 66 confronts the previously mentioned open slot 60, between the ears 58, to facilitate the entry of a suitable tool or instrument, for example, the blade of a screw driver, between the pan and the adjacent guide part 56. Therefore, it will be understood that the pan may be removed from the mounting member 48 by first tilting the pan, as illustrated in Fig. 7, and then inserting the tool between the slotted portion 60 and the cut-out 66 at the upper side of the pan to urge the ears 58 out of engagement with the pan whereupon the latter may be readily removed from the member 48. In this connection, it will be understood that the guide parts 56 are sufficiently resilient for this purpose and spring back into position when the tool is removed. Similarly, in order to mount the pan in the guide member 48, the pan is inserted and first tilted to the position illustrated in Fig. 7, and the guide part 56 adjacent the upper edge of the pan is then urged by the tool laterally away from the adjacent pan edge to permit the latter to engage in the member 48.

As here shown, the pan 62 is adapted to mount a pair of circuit breakers 12. In this connection, the pan is provided with a mounting block member 68, preferably formed of "Bakelite" or other suitable insulating material. The pan is provided with the spaced apertures 70 for receiving the depending portions or pins 72 formed in the mounting block 68, as best illustrated in Fig. 4. In addition, the pan is provided with the struck-out ears or tabs 74 which are bent down to engage the block 68, as illustrated in Fig. 4, after the portions 72 are engaged in the aperture 70. Therefore, it will be apparent that the contact block 68 is firmly secured on the pan. As here shown, the contact block has provision for mounting a pair of circuit breakers of the "plug-in" or stab type, said circuit breakers being provided with the stab contacts 76 for this purpose. More specifically, the contact block is provided with an insulated barrier 78 which separates the contact units 80—80 which seat on the block 68. Said units are preferably of the type described in the co-pending application for patent Ser. No. 127,432 filed November 15, 1949 by Thomas M. Cole and myself and assigned to the assignee hereof. As there described, and as here shown, each contact unit is provided with a terminal member 82 for connection to a power line (not illustrated) and with a contact terminal 84 formed in a conducting member 86 mounted on the block 68 as by the screw 88. It will be apparent that when the stab contact 76 is engaged in the contact terminal 84, it will be in circuit with the power line. It will also be noted that the engagement of the stab 76 in the contact terminal 84 serves to physically mount one end of the circuit breaker 12, the other end of which is provided with a recessed portion 90 which engages a struck-up ear 92 provided on the pan 62 to securely but releasably mount the circuit breaker thereon. As here shown, the circuit breaker is provided at said other end thereof with a terminal connector 94 for connection to the load. The block is also provided, as here shown, with a neutral bus bar 96 provided with the terminal connectors 98 therein for connection to the neutral side of a circuit.

With the enclosure 10 inserted for flush-mounting in a wall, as illustrated in Fig. 3, and with the circuit breakers 12 mounted on the pan 62, it will be apparent that the spring 44 biases the circuit breakers for movement outwardly of the open face of the enclosure, as limited by the previously described engagement of the pan and the ears 58. It will be noted that the cover or front plate 16 is apertured, as at 100, so that the handles or operating members 102 of the circuit breakers extend therethrough. When the cover is mounted on the wall 14 and secured on the enclosure 10 by means of the fastening elements 22, it will be apparent that the spring 44 will be effective to constantly force the circuit breakers against the cover 16. However, due to the previously described universal mounting of the pan 62, it will be readily understood that the circuit breakers will be adjustably positioned within the enclosure 10, depending upon the deviation from parallelism between the surface of the wall 14 and the plane of the open front 38 of the enclosure, so that the handles 102 thereof will always protrude from the openings 100 in the closure 16 for proper operation of the circuit breakers, said handles always being correctly aligned in said closure. In this connection, it will be understood that when the box 18 is not flush-mounted but is surface-mounted on a wall or other suitable support, the universal mounting of the circuit breakers on the universally mounted pan 62 will compensate for manufacturing inaccuracies or tolerances, for example, where the front closure, when secured, is not parallel to the back wall or front opening 38 of the enclosure. It will also be understood that the universal mounting of the pan 62 greatly facilitates the wiring connections to the circuit breakers or other electrical devices mounted on the pan where such wiring is accomplished without the removal of the pan from the enclosure. It will also be apparent that the previously described ready removal of the pan from its mounting member 48 facilitates said wiring outside of the enclosure.

It will be noted that the cover 16 is provided with an apertured ear 104 adjacent the apertures 100 through which the circuit breaker handles 102 project. In this connection, as is well known to those skilled in the art, it will be understood that where a pair of separate single pole circuit breakers 12 are desired to be operated as a double-pole circuit breaker, this may be readily accomplished by providing a handle extension or tie (not illustrated) to engage both of the handles 102. Where this is done, a hasp lock may be inserted in the aperture of the ear 104 so that the hasp thereof will retain the handles either in their circuit-open or circuit-closed position, as may be desired.

Referring now to Figs. 8 through 12, there is disclosed another embodiment of the invention pursuant to which provision is made for mounting four circuit breakers. As herein shown, the enclosure 106 is of the convertible or combination flush or surface-mounting type and is preferably of the type illustrated and described in the co-pending application of Thomas M. Cole, Ser. No. 120,122 filed October 7, 1949 and assigned to the assignee hereof. As therein illustrated and described, and as here shown, the box is provided with the tapped members 108 for receiving the fastening elements 110 which are mounted in apertures 112 formed in the cover or front closure 114. It will be noted that the box is provided with a peripherally extending shoulder 116 which is embedded in the wall and covered with plaster or other wall material when the box is flush-mounted, as described in said application, Ser. No. 120,122. However, when the box is to be surface-mounted, an auxiliary frame member, as disclosed in said latter application, is provided on the shoulder 116.

Pursuant to the present embodiment, there is provided a combined guide and retainer member 48A adapted for receiving a pair of the previously described conical helical springs 44. More specifically, said member 48A is provided with the circular portions 50A—50A, each of which is provided with the opposing lugs or ears 52A—52A. At the opposing ends thereof the member 48A is also provided with the upstanding guide parts 56A—56A, each of which is provided on the free end thereof with the inturned pair of ears 58A—58A, separated by the open slotted portions 60A—60A, respectively. In order to accommodate the pair of springs 44, the rear wall 30A of the enclosure 106 is provided with the spaced circular recesses 42A—42A. The member 48A is suitably secured to the rear wall 30A, as by welding or brazing, so that the circular portions 50A—50A will be concentric with the recesses 42A—42A, respectively. The widest or largest convolution 46 of each of the springs 44 is threaded into one of the recesses 42A, being retained therein by the lugs 52A, as previously described. The mounting pan 62A is provided with the cut-out portions 64A for engagement with the guide parts 56A—56A, respectively, and is also provided with the additional cutouts 66A—66A which oppose the slots 60A—60A, respectively, for the insertion of a tool to facilitate the removal from or the assembly of, the pan 62A in the member 48A, as previously described in connection with Figs. 1 through 7. Therefore, it will be apparent that the pan 62A is mounted for universal tilting or pivotal movement on the springs 44 which bias the latter in a direction toward engagement with the overlying ears 58A.

It will be understood that the mounting block 68A is provided with depending portions, such as 72 on block 68, for engagement in the apertures 70A defined in the pan 62A. In addition, the pan is provided with the struck-out ears 74A which are bent over adjacent portions of the block 68A, as illustrated in Fig. 12, after the pins 72 are inserted in the aperture 70A, in order to firmly secure the mounting block 68A on the pan. In order to accommodate four circuit breakers of the "plug-in" or stab type, the contact units 80A—80A are each provided with two contact terminals 84A—84A and with a line terminal 82A. In addition, the insulated contact block 68A is provided with an insulating barrier portion 78A interposed between the contact units 80A—80A. A neutral bus bar 96A provided with terminal connectors 98A for the neutral lines, is also provided on the contact block. Therefore, it will be apparent that the prong 76 of each circuit breaker 12 may be engaged in a contact terminal 84A to provide an electrical connection as well as a good physical connection between the circuit breaker and the contact block 68A. The pan 62A is also provided with the struck-out ears 92A for engaging the other end of each of the circuit breakers, as previously described.

The front cover or closure member 114, as here shown, is provided with four apertures 100A to accommodate the handles 102A of the circuit breakers which may be mounted on the pan 62A. It will be understood that when the enclosure 106 is flush-mounted in a wall, the circuit breakers being mounted on the pan 62A and the front closure 114 being secured on the enclosure, as illustrated in Fig. 10, the springs 44 will be effective to continuously urge the circuit breakers against the said closure 114, and the universal mounting of the pan 62A in the member 48A will permit for the automatic adjustment of the circuit breakers relative to the front closure 114 for proper alignment therein, to compensate for any deviation from parallelism between the surface of the wall and the open face of the enclosure, as previously described in connection with the closure 10.

While the embodiment illustrated in Figs. 1 through 7 is adapted to provide for the mounting of two circuit breakers, it will be apparent that if desired only one circuit breaker may be mounted thereon, and in this connection it will be understood that any number less than four circuit breakers may be mounted on the embodiment illustrated in Figs. 8 through 12. However, it will be readily apparent that regardless of the specific embodiment, applicant has provided a novel and highly advantageous mounting for circuit breakers or other electric devices pursuant to which the front of the circuit breakers or other devices are always quickly and readily aligned with the face or closure of the enclosure and are always level with the wall surface.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In combination, an enclosure for an electric device, a front closure for said enclosure, a support for said device, and means providing a substantially universal mounting for said support within said enclosure, said means biasing said support toward said closure whereby to align said device relative to said closure, said means being spring means mounted in said enclosure in opposition to said closure, and a member secured in said enclosure for retaining said support against rotation in the plane thereof, said spring means being mounted separately from said member.

2. In combination, an enclosure for an electric device, a front closure for said enclosure, a support for said device, and means providing a substantially universal mounting for said support within said enclosure, said means biasing said support toward said closure whereby to align said device relative to said closure, said means being spring means mounted in said enclosure in opposition to said closure, and a member secured in said enclosure for retaining said support against rotation in the plane thereof, said spring means being mounted separately from said member, said member having parts thereof extending in the direction of said front closure, marginal edges of said support being in slidable engagement with said parts, respectively.

3. In combination, an enclosure for an electric device, a front closure for said enclosure, a support for said device, and means providing a substantially universal mounting for said support within said enclosure, said means biasing said support toward said closure whereby to align said device relative to said closure, said means being spring means mounted in said enclosure in opposition to said closure, and a member secured in said enclosure for retaining said support against rotation in the plane thereof, said spring means being mounted separately from said member, said member having parts thereof extending in the direction of said front closure, marginal edges of said support being in slidable engagement with said parts, respectively, said parts having portions overlying said support for limiting the movement thereof toward said closure.

4. In combination, an enclosure for an electric device, a front closure for said enclosure, a support for said device, and means providing a substantially universal mounting for said support within said enclosure, said means biasing said support toward said closure whereby to align said device relative to said closure, said means being spring means mounted in said enclosure in opposition to said closure, said support being mounted on one end of said spring means, and a member secured in said enclosure for retaining said support against rotation in the plane thereof, said spring means mounted separately from said member, the other end of said spring being retained against the rear of said enclosure by said member.

5. In combination, a circuit breaker enclosure, a front closure therefor adapted for the protrusion of a circuit breaker handle therethrough, a circuit breaker mounting pan, and means providing a substantially universal mounting for said pan within said enclosure, said means biasing said pan for movement toward said closure for aligning the handle therein, and said means including a spring having an axis which normally extends in the direction of said movement, said spring being mounted for limited movement transversely of said axis.

6. In combination, a circuit breaker enclosure, a front closure therefor adapted for the protrusion of a circuit breaker handle therethrough, a circuit breaker mounting pan and means providing a substantially universal mounting for said pan within said enclosure, said means biasing said pan toward said closure for aligning the handle therein, said pan having means for removably mounting a circuit breaker thereon, said latter means including a contact block member carried by said pan and adapted to connect the circuit breaker in a circuit for control thereby.

7. In combination, a circuit breaker enclosure, a front closure therefor adapted for the protrusion of a circuit breaker handle therethrough, a circuit breaker mounting pan and means providing a substantially universal mounting for said pan within said enclosure, said means biasing said pan toward said closure for aligning the circuit breaker handle therein, said pan having means for removably mounting a circuit breaker thereon, said latter means including a contact block member carried by said pan and adapted to connect the circuit breaker in a circuit for control thereby, said pan being apertured and said contact block member having a projection inserted in said aperture, and a part on said pan in engagement with said member for preventing the removal of said projection from said aperture.

8. A mounting pan for an electric device, said pan having means for removably mounting said device thereon, said means including an insulated member mounted on said pan and provided with current conductive means for connecting said device in a circuit, said member being provided with a projecting portion and said pan being apertured to receive said portion, and a pan part engageable with said member for retaining the latter against displacement therefrom.

9. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, means secured to said enclosure for guiding said plate for movement toward and away from said cover, said guiding means having inturned front portions overlying the front of said plate at marginal edges thereof for limiting forward movement of said plate, and spring means mounted on said enclosure separately from said guiding means and acting on said plate for biasing the latter toward the front of said enclosure and for resiliently opposing movement of said plate away from the front of said enclosure.

10. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, means secured to said enclosure for guiding said plate for movement toward and away from said cover, said guiding means having inturned front portions overlying the front of said plate at marginal edges thereof for limiting forward movement of said plate, and spring means mounted on said enclosure separately from said guiding means and acting on said plate for biasing the latter toward the front of said enclosure and for resiliently opposing movement of said plate away from the front of said enclosure, at least one of said inturned portions of the guiding means having a recess through which a tool may be inserted for removing said plate from said guiding means.

11. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, means secured to said enclosure for guiding said plate for movement toward and away from said cover, said guiding means having means for limiting forward movement of said plate, and spring means interposed between said enclosure and said plate for biasing the latter toward the front of said enclosure for resiliently opposing movement of said plate away from the front of said enclosure, one end of said spring means being fixed and the other end being free for lateral movement relative to said fixed end, whereby to provide a substantially universal mounting for said plate within said enclosure.

12. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, means secured to said enclosure for guiding said plate for movement toward and away from said cover, said guiding means having means for limiting forward movement of said plate, and spring means interposed between said enclosure and said plate for biasing the latter toward the front of said enclosure for resiliently opposing movement of said plate away from the front of said enclosure, the axis of said spring means normally extending in the direction of said movement toward and away from said cover, and means mounting said spring means for limited movement transversely of said axis, whereby to provide a substantially universal mounting for said plate within said enclosure.

13. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, means secured to said enclosure for guiding said plate for movement toward and away from said cover, said guiding means having inturned front portions overlying the front of said plate at marginal edges thereof for limiting forward movement of said plate, and spring means mounted in said enclosure and acting on said plate for biasing the latter toward the front of said enclosure and for resiliently opposing movement of said plate away from the front of said enclosure, said spring means being constituted by a single spring member which is independent of said guiding means and which constitutes a fulcrum for said plate.

14. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, means secured to said enclosure for guiding said plate for movement toward and away from said cover, said guiding means having means for limiting forward movement of said plate, and spring means interposed between said enclosure and said plate for biasing the latter toward the front of said enclosure for resiliently opposing movement of said plate away from the front of said enclosure, said spring means being mounted on said enclosure separately from said guiding means and constituting a fulcrum for said plate.

15. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, means secured to said enclosure for guiding said plate for movement toward and away from said cover, said guiding means having inturned front portions overlying the front of said plate at marginal edges thereof for limiting forward movement of said plate, and spring means mounted in said enclosure and acting on said plate for biasing the latter toward the front of said enclosure and for resiliently opposing movement of said plate away from the front of said enclosure, said spring means being constituted by a single spring member which constitutes a fulcrum for said plate, said spring member acting upon said plate substantially mid-way between the marginal side edges thereof, and guide means for said plate in slidable engagement with said side edges.

16. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, and spring means mounted in said enclosure and acting on said plate for biasing the latter toward the front of said enclosure and for resiliently opposing movement of said plate away from the front of said enclosure, said spring means acting upon said plate substantially mid-way between the marginal side edges thereof to provide a fulcrum about which said plate is free to pivot, and guide means for said plate in slidable engagement with said side edges.

17. In an enclosure for an electric device, said enclosure having a front cover and means for securing said cover in adjusted front to rear position in relation to said device; means in said enclosure for supporting said device in adjusted position in relation to said cover, said supporting means comprising a plate having provision for the securement of said device thereto, means secured to said enclosure for guiding said plate for movement toward and away from said cover, said guiding means having inturned front portions overlying the front of said plate at marginal edges thereof for limiting forward movement of said plate, and spring means mounted on said enclosure separately from said guiding means and acting on said plate for biasing the latter toward the front of said enclosure and for resiliently opposing movement of said plate away from the front of said enclosure, said guiding means having a rear portion for securing one end of said spring means in position on said enclosure, the other end of said spring means abutting said plate and being movable laterally of said one end.

18. A guide and spring retainer assembly for an electric device mounting pan, said assembly comprising a member having a base portion provided with upstanding laterally spaced arms for guiding the pan for movement toward and away from said base portion, said arms having inturned portions for limiting movement of the pan away from said base portion, and spring-retainer means provided on said base portion intermediate said arms thereof, whereby to mount a spring between said base portion and the pan.

19. A guide and spring retainer assembly for an electric device mounting pan, said assembly comprising a member having a base portion provided with upstanding laterally spaced arms for guiding the pan for movement toward and away from said base portion, said arms having inturned portions for limiting movement of the pan away from said base portion, and spring-retainer means provided on said base portion intermediate said arms thereof, whereby to mount a spring between said base portion and the pan, said retainer means comprising means defining an aperture in said base portion adapted to receive a spring and confronting lugs extending into said aperture for engagement with the spring.

20. In an enclosure for an electric device, said enclosure having a front cover and means for securing said cover in adjusted front to rear position in relation to said device; a guide and spring retainer assembly for an electric device mounting pan, said assembly comprising a member having a base portion mounted on the rear wall of said enclosure, said base portion being provided with upstanding laterally spaced arms for guiding the pan for movement toward and away from said rear wall, said arms having inturned portions for limiting movement of the pan away from said rear wall, and spring-retainer means provided on said base portion intermediate said arms thereof, whereby to mount a spring between said base portion and the pan, said retainer means comprising means defining an aperture in said base portion adapted to receive a spring and confronting lugs extending into said aperture for engagement with the spring, and means defining a recess in said rear wall underlying said aperture and adapted to seat the spring.

21. In an enclosure for an electric device, said enclosure having a front cover and means for securing said cover in adjusted front to rear position in relation to said device; a guide and spring retainer assembly for an electric device mounting pan, said assembly comprising a member having a base portion mounted on the rear wall of said enclosure, said base portion being provided with upstanding laterally spaced arms for guiding the pan for movement toward and away from said rear wall, said arms having inturned portions for limiting movement of the pan away from said rear wall, and spring-retainer means provided on said base portion intermediate said arms thereof, whereby to mount a spring between said base portion and the pan, said retainer means comprising means defining an aperture in said base portion adapted to receive a spring and confronting lugs extending into said aperture for engagement with the spring, and means defining a recess in said rear wall underlying said aperture and adapted to seat the spring, and a conical helical spring having the larger end thereof extending through said aperture and retained in seated disposition in said recess by said lugs.

References Cited in the file of this patent

UNITED STATES PATENTS

| Number | Name | Date |
|---|---|---|
| 2,183,872 | Rowe | Dec. 19, 1939 |
| 2,467,653 | Berthier | Apr. 19, 1949 |
| 2,536,944 | Kirkby | Jan. 2, 1951 |